Figure 1:
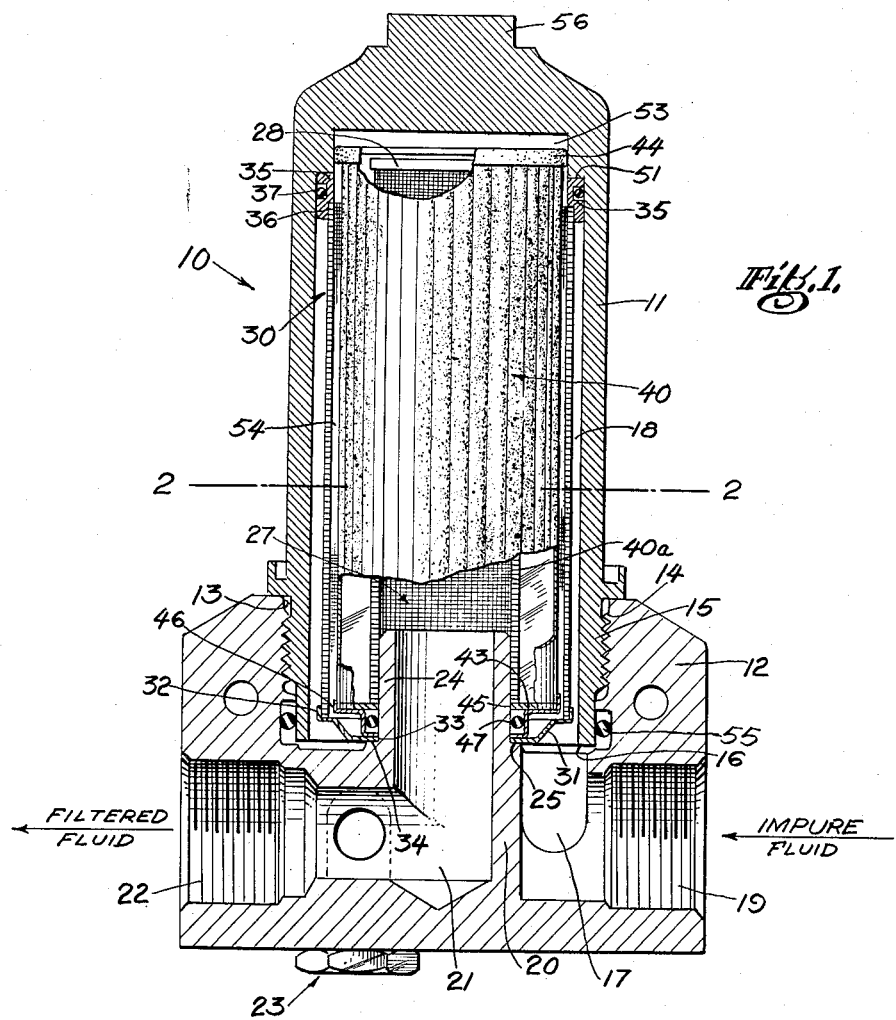

April 24, 1956

J. P. KOVACS 2,743,017

MULTIPLE STAGE FILTER

Filed May 10, 1954

INVENTOR
Julius P. Kovacs
BY
Kenyon & Kenyon
ATTORNEYS

United States Patent Office 2,743,017
Patented Apr. 24, 1956

2,743,017

MULTIPLE STAGE FILTER

Julius P. Kovacs, Westfield, N. J., assignor to Purolator Products, Inc., Rahway, N. J., a corporation of Delaware Application May 10, 1954, Serial No. 428,669

6 Claims. (Cl. 210—183)

This invention relates to improvements in filters, and more particularly to filters used in connection with mechanisms whose operation is dependent upon the use of hydraulic operating fluids. This application is a continuation-in-part of my co-pending application Ser. No. 377,129 filed August 28, 1953.

In mechanisms of the type mentioned, for example, those involving operation of aircraft landing gear, aircraft cowl flaps and other aerodynamic surfaces, it is essential that the hydraulic operating fluid used in these mechanisms be carefully filtered to the finest extent of filtration possible in order to avoid mechanical failures of the mechanisms by reason of the presence of solid impurities. The avoidance of such mechanical failures is especially important in aircraft. For the fine degree of filtering necessary in order to keep the hydraulic fluid entirely free of solid impurities which might cause failure of the mechanism, it has been found that the fluid must be filtered through a pleated resin-impregnated cellulosic type of filter element such, for example, as the pleated filter element manufactured by PurOlator Products, Inc., and described in U. S. Patent No. 2,642,187 to Bell, granted June 16, 1953. However, where the hydraulic fluid mechanism involved is used for one of the purposes above referred to, some of the solid impurities occurring in use of the mechanism have been found to be sharp slivers of metal. If the pleated impregnated filter element above mentioned is used alone in a filtering system using hydraulic fluid for the purposes mentioned, these slivers frequently puncture the filter element which is relatively fragile and as a result materially impair or destroy the fine filtering action of the element. Such destruction or impairment in consequence increases the hazards of mechanical failure of the mechanism.

In order to eliminate this difficulty and to obviate the puncturing hazards, this invention contemplates protective arrangements in the filter by way of the use of a metallic edge type filter element in conjunction with the pleated cellulosic type of filter element arranged in such a way with respect to the latter element that the fluid being filtered must first pass through the edge type metallic element before its passage through the cellulosic element. The metallic edge type element has filtering interstices that are small enough to trap the harmful metallic slivers and prevent their reaching the cellulosic element. This eliminates the hazards of puncturing the cellulosic element, and the latter is entirely free to perform its fine filtering function.

As an additional safety measure, the invention also contemplates the use of a second metal edge type element in the system so located relative to the cellulosic element through which the fluid has passed that it must also flow through the second edge type element. Thus, if by chance metallic slivers have actually gotten through the first-mentioned edge type metallic element and have punctured the cellulosic element, such slivers and those cellulosic particles torn from the cellulosic element as a result of its puncture, will be trapped and retained by the second edge type metallic filter element, and prevented from interfering with operation of the mechanism.

The use of the second metal edge type filter element makes it possible to simplify the construction of the pleated cellulosic element by eliminating the need to provide an internal helical coil spring or perforated metal cylinder to act as a guide or spacer for the inner longitudinal folds of the pleats of cellulosic material. Instead of using the spring or metal cylinder, the inner pleat folds may be arranged to lie in direct contact with the external surface of the second or inner metal edge type filter element and said surface functions directly as a guide or spacer for said inner folds and also as a reinforcement or support for the entire pleated cellulosic element. This reinforcement or support is of especial advantage where filtration of hydraulic fluids at high pressures is involved. The elimination of the spring or perforated cylinder materially reduces costs of production of the pleated filter element.

In practicing the invention, the metallic edge type filter elements which have tubular form are arranged concentrically relative to the cellulosic filter element which also has general overall tubular form so that one of the metallic edge type filter elements lies outwardly of the outer surface of the pleated cellulosic filter element, and so that the inner folds of the pleated cellulosic filter element lie in direct contact with the outermost surface of the second or inner metallic edge type filter element. The three concentrically arranged filter elements in effect provide three step filtration through the filter in which they are arranged. This three stage filtration results in increased safety because more solid particles or impurities may be removed by passage of the hydraulic fluid through the three stages a fewer number of times than would be required if but a single filtration step were provided.

In practicing the invention the metallic edge type filter elements mentioned above may be frame-supported type elements such as are shown and described in Liddell Patent No. 2,042,537, or frameless self-supporting metallic edge type filter elements such as shown and described in Kovacs U. S. Patent No. 2,622,738, or they may be any other suitable type of metallic edge type filter element of the helically wound wire or disc type.

Any combination of metallic edge type filter elements of the type described may be used with the cellulosic type filter element to provide the composite multi-stage filter embodying the invention.

Objects and features of this invention are to provide a filter device that will be effective for use in hydraulic mechanisms of the type hereinabove described and which will adequately and efficiently filter the hydraulic fluid and remove all dangerous solid impurities that could cause impairment of function of the hydraulically operated mechanism.

Further objects and features of the invention are to provide filters utilizing multi-stage filtration whereby the hydraulically operated mechanism that is being served or operated by the filtered hydraulic fluid will be fully protected against the hazards of failure by reason of the presence of impurities such as cellulosic fibers or metal slivers in the filtered fluid.

Further objects and features of the invention are the simplification of the structural details of the pleated cellulosic filter element with the resultant economies in production and replacement costs.

Further objects and features of the invention are the provision of a multi-stage filter that is particularly useful for filtration purposes in high pressure hydraulic systems.

Further objects and features of the invention are the provision of filter structure providing multi-stage filtration that may be readily assembled and manufactured cheaply and in which clogged filter elements may be readily removed for cleaning or replacement.

Figure 2:
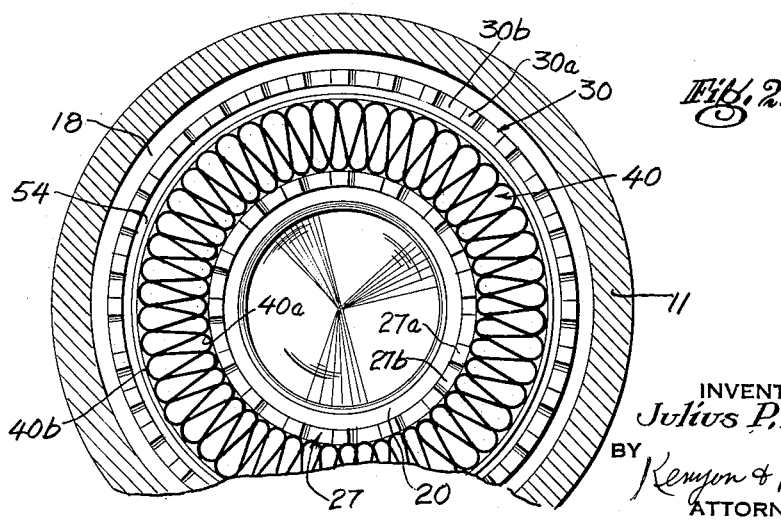

Further objects and features of the invention will become apparent from the following specification and the accompanying drawings, wherein:

Fig. 1 is a view partially in vertical section of a filter embodying the invention; and Fig. 2 is a transverse sectional view of the filter taken along line 2—2 of Fig. 1.

Referring now to the drawings, the reference character 10 denotes the filter or filter assembly as a whole. This filter 10 comprises a hollow body or casing 11 and a hollow base 12 with which the casing 11 is threadedly engaged as will be described. The body or casing 11 assembled with the base 12 constitutes a filter housing.

The base 12 has an open topped bore 13 that is internally threaded at 14 to receive the threaded portion 15 of the casing 11. The bore 13 extends downwardly in the base 12 below the lower open end 16 of the casing 11 to provide a chamber 17. This chamber 17 is in direct communication with the interior 18 of the casing 11 for purposes presently to be described. An inlet port or passageway 19 extending through a wall of the base 12 communicates directly with the chamber 17 and serves to admit fluid or liquid to be filtered to the filter 10.

A tubular member or center tube 20 which preferably is integral with the base 12 extends axially of the bore 13 and of chamber 17. Preferably this tubular member 20 is centrally located relative to the chamber 17 so that the latter is generally annular in shape. The bore 21 of the tubular member 20 defines a second chamber in the base 12 which is separated from the chamber 17 by the walls of said tubular member 20. An outlet passageway or port 22 is provided in a wall of the base 12 and communicates directly with the bore or chamber 21. The outlet port or passageway 22 provides for egress of filtered fluid from the filter 10 via the base 12 as will be presently described.

In the embodiment shown, the inlet port 19 and the outlet port 22 are axially aligned. Such alignment, however, is optional.

A relief valve assembly denoted generally by the reference character 23 is provided in the base 12. This relief valve assembly 23 which forms no part of the present invention is of any conventional type and serves to provide for direct relief flow of fluid from the inlet port 19 to the outlet port 22 in the event of clogged conditions of the filter elements in the filter 10.

The tubular member 20 has a portion 24 of reduced external diameter to provide an annular seat 25. The reduced portion 24 of the tubular member 20 serves as a mount for a tubular metallic edge type filter element 27. This metallic edge type filter element in the embodiment shown is one made in accordance with the teachings of the aforesaid Kovacs Patent No. 2,622,738.

Such metallic edge type filter element 27 generally consists of a helically wound coil of flat thin metallic ribbon which has ribs or projections 27a (see Fig. 2) on one wide face of the ribbon and which projections serve to space the adjacent turns of the ribbon and define filtering interstices 27b between adjacent turns. As described in the aforesaid Kovacs Patent, the ribs 27a are appropriately bonded to the smooth wide face of the adjacent ribbon turn so that the entire helix formed by the wound ribbon provides the tubular member completely self-supporting metallic edge type filter element 27. The relative heights of the ribs 27a of the ribbon and the spacing between adjacent ribs determine the size of the filtering interstices.

The tubular self-supporting edge type metallic filter element 27 has one of its ends positioned on the portion 24 of the tubular member 20 of base 12, as seen clearly in Fig. 1. The diameter of the filter element 27 is such that its end fits tightly on said portion 24 of the tubular member 20 and a force fit may be used if desired to insure a tight connection. As seen clearly in Fig. 1, a cap 28 closes off the upper end of the metallic edge type filter element 27 and prevents flow of fluid to be filtered other than through the filtering interstices of said edge type metallic filter element 27.

A second metallic edge type filter element 30, whose construction is like that of filter element 27 but which is of considerably larger diameter, is provided. This second metallic edge type filter element 30 has ribs 30a and filtering interstices 30b. At its bottom end the filter element 30 has an end cap 31. This end cap 31 is secured to the bottom end of the filter element 30 as by an annular rim portion 32. This rim portion 32 may be welded or soldered in fixed relationship to said lower end of said element 30 in the position shown in Fig. 1. A centrally located opening 33 is provided in a flange portion 34 of the end cap 31. The opening 33 is dimensioned to fit slidably on the reduced portion 24 of the tubular member 20 so that the flange portion 34 of the end cap 31 rests upon the seat 25. The end cap member 31 thus serves to support the tubular metallic edge type filter element 30 concentrically and in spaced relationship relative to the first-named tubular metallic edge type filter element 27.

An annular ring member 35 is secured adjacent the upper end of the second metallic edge type filter element 30, this member 35 being appropriately fastened or secured as by welding or soldering at 36 to said upper end of the filter element 30. An O-ring sealing member 37 is carried in an appropriate recess provided in the ring 35.

A resin-impregnated cellulosic pleated type filter element 40 is also carried removably on the tubular member 20, and as shown this cellulosic filter element 40 lies intermediate or between the two metallic edge type filter elements 27 and 30 and in concentric relationship thereto. In general, the pleated cellulosic filter element 40 comprises pleated, phenol - formaldehyde - resin - impregnated cellulosic material, such as paper. This material, after pleating, is arranged in the form of a tubular annulus in which the inner folds 40a and outer folds 40b of the pleats extend substantially in the axial direction of the tubular annulus, and in which the walls or stretches of the pleats are substantially radially arranged relative to the axis of said tubular annulus. The open ends of the pleats at the upper and lower ends of the pleatings in the annulus are sealed by respective end caps 43 and 44. The end caps 43 and 44 are appropriately secured to the end edges of the pleats as by cementing for example, as has been described in the aforesaid Bell Patent No. 2,642,187.

The end cap 43 has a centrally located opening 45. This opening 45 has a diameter which is dimensioned so that end cap 43 will fit slidably on the reduced portion 24 of the tubular member 20 and rest in a cup 46 carrying an O-ring sealing member 47. The cup 46 is mounted on tubular member 20 to lie between the lower face of the end cap 43 and the upper face of the flange 34 of the end cap 31 of tubular metallic edge type filter element 30.

The inner metallic edge type element 27 is dimensioned and located in the center hole of the pleated cellulosic filter element 40 so that the inner folds 40a of the latter lie in direct contact with the outermost surface of said element 27. The latter surface thus acts as a guide for said inner folds 40a and as an inner reinforcement for the entire cellulosic element 40 without requirement for an inner spring or perforated tubular element of the kind described in the aforesaid Bell Patent No. 2,642,187. The inner edge type filter element 27 preferably extends substantially the full axial length between end caps 43 and 44 of the pleated cellulosic element 40 and is retained in place inside said pleated element 40 by the end caps 43 and 44. Thus, the elements 40 and 27 may be mounted on and demounted from tubular member 20 as a unit for replacement whenever necessary.

The filter casing 11 has an inwardly projecting annular shoulder 51 which is so located that it will be tightened against the upper surface of annular ring 35 when the casing 11 is threaded into the base 12 thus serving to hold the tubular filter element 30 firmly against longitudinal or axial displacement on the tubular member 20.

The upper end cap 44 of the cellulosic filter element 40 fits into a centrally located reduced portion 53 of the casing 11 above the shoulder 51 and thus the cellulosic filter element 40 is centered at its upper end and maintained in its concentric relationship relative to the metallic edge type filter element 30. The outer folds 40b of the pleats of filter element 40 then lie somewhat spaced from the inner surface of the metallic edge type filter element 30, the space being identified by the reference character 54. If desired, the outer folds 40b may be dimensioned to lie in contact with the inner surface of outer element 30.

The O-sealing ring 55 near the lower end of casing 11 prevents leakage of fluid entering the base 12 through the port 19 around the engaging threaded portions 14 and 15 of the base 12 and the casing 11. The upper end of the casing 11 is provided externally with a wrench engaging projection 56 to facilitate tightening of the casing 11 into the base 12.

The operation of the filtering assembly just described is as follows:

The three filter elements 27, 40 and 30 are mounted concentrically on the tubular member 20 of the base 12 as described and the casing 11 is then slid over the assembled filter elements now carried by tubular member 20 and is tightened into threaded engagement with the base 12. Inlet port 19 is connected by a conduit (not shown) to the supply source of the impure hydraulic fluid that is to be filtered and the outlet port 22 is connected by a conduit (not shown) to effect delivery of filtered fluid from filter 10 for use in the hydraulic mechanism (not shown).

The impure fluid to be filtered which enters the port or passage 19 flows into the chamber 17 and thence into the portions of the chamber 18 of the casing 11 which are external to the outer surface of the metallic edge type filter element 30. Because of the sealing members 37 and 47, the fluid in said portions of chamber 18 can only flow through the interstices 30b of the outer metallic edge type filter element 30, and after emerging from the inner surface of said element 30 is distributed in the annular space 54 between the outer fold edges 40b of the pleated cellulosic filter element 40 and said inner surface of said metallic edge type element 30.

In the passage of the fluid through the interstices 30b of the metallic edge type element 30, any large solid impurities therein such as metal slivers are trapped and retained on the outer surface of said element 30 as the interstices 30b of the latter are small enough to preclude their passage with the fluid. Thus the fluid reaching the space 54 is free of such metallic slivers and other large impurities which could cause rupture and damage to the pleated cellulosic filter element 40. Because of end caps 43 and 44 which also act as sealing means, the fluid reaching the space 54 then flows through the pleated cellulosic filter element 40 before it can reach the inner metallic edge type element 27. In its passage through the pleated cellulosic filter element 40 whose interstices are of microscopic size, very fine filtration is effected, ridding the fluid substantailly of all those of its solid impurities which were not removed by the initial passage through the outer metallic edge type filter element 30. Because of end cap 28 and tight fit of element 27 on portion 24 of center tube 20, the filtered fluid or filtrate leaving the element 40 then can only flow through the interstices 27b of the innermost metallic edge type filter element 27. The latter element 27 acts as a safety device and the flow therethrough of the fluid leaving element 40 rids such fluid of any metallic slivers that may have accidentally passed through the outer metallic element 30 and effected a partial rupture or puncture of the cellulosic element 40. Since inner folds 40b of element 40 lie in direct contact with filter element 27, the latter reinforces the cellulosic element 40 and makes it capable of withstanding the disruptive action of high pressure hydraulic fluids. Filter element 27 also traps any cellulosic fibers that may have been torn from the cellulosic element 40 by its partial accidental rupture. The fluid after passing through the interstices 27b of the inner metallic edge type element 27 passes downwardly into the bore or chamber 21 of the tubular member 20 and from there outwardly through the port or passage 22 of the base 12. The filtered fluid or filtrate emerging from the port of passage 22 is entirely free of solid impurities that might be harmful in the hydraulic mechanisms (not shown) to which it is delivered from the port 22 for operational purposes.

It is to be noted that the passage of the fluid through the three concentrically arranged filter elements 30, 40 and 27 results in multi-stage filtration and that each stage accomplishes a specific purpose. The first stage is the passage through the outermost edge type metallic filter element 30 which rids the fluid of substantially all large harmful impurities including metal slivers. The second stage is the subsequent passage of the fluid through the fine filtering cellulosic filter element 40 which effectively rids the fluid of all remaining solid impurities that have not been trapped in the first stage of filtration. The third stage of filtration is the passage subsequently of the fluid through the internally located metallic edge type element 27. In the latter stage any accidentally passed metallic slivers or cellulosic fibers torn from the cellulosic filter element 40 are trapped. With the construction shown, the presence of a protective edge type metallic filter element on each side of the cellulosic filter element 40 also permits reverse filtering action to be practiced with the filter assembly 10 simply by reversing the connections to the respective ports 19 and 22. In that event, the port 22 becomes the inlet port and the port 19 becomes the outlet port.

When the trapped impurities clog any of the three filter elements 27, 40 or 30, to such an extent that effective filtration is no longer possible, it is a simple matter to unscrew the casing 11 from its base 12 and remove all or any of the clogged elements either for cleansing or for replacement.

If desired, additional stages of filtration may be provided in a single housing by alternating a plurality of metallic edge type filter elements and cellulosic type filter elements in any concentric arrangement.

While a specific embodiment of the invention has been disclosed and described herein, variations in structural details within the scope of the claims are possible and are contemplated. There is no intention, therefore, of limitation to the exact details shown and described.

What is claimed is:

1. A filter assembly comprising a generally cylindrical housing having inlet and outlet ports, a center tube within said housing communicating with one of said ports, a plurality of tubular filter elements within said housing, one of said elements being an edge type element and a second of said elements being a pleated cellulosic type of element arranged in the form of a tubular annulus positioned concentrically about the tubular edge type element and having its innermost pleat folds in contact with the outermost surface of said edge type element, said concentric elements being separately insertable into and removable from the assembly, and means for directing passage of fluid to be filtered that enters the housing via its inlet port successively through all of the filter elements before emerging in filtered condition from the outlet port of said housing.

2. A filter assembly comprising a hollow casing and a base removably joined together, said base having a chamber and an inlet port communicating therewith, a center tube in said base defining a second chamber separated from the first-named chamber, said base having an outlet port communicating with said second chamber, a plurality of concentrically arranged, separately insertable and removable filter elements carried by said center tube and extending into said casing, the innermost of said filter elements being an edge type of filter element, and next adjacent of said filter elements being a pleated cellulosic type of filter element whose innermost pleat folds are in direct contact with the outermost surface of said edge type filter element, said filter elements being arranged on said center tube so that filtering flow is in succession from the inlet port through all the filter elements in the casing and then into the center tube before emergence of filtrate from said outlet port.

3. A filter assembly comprising a hollow casing and a base removably joined together, said base having a chamber and a port communicating therewith, a center tube in said base defining a second chamber separated from the first-named chamber, said base having a port communicating with the center tube, a tubular edge type filter element having one end fitted onto said center tube and extending upwardly therefrom into said casing, a tubular, pleated, resin-impregnated, cellulosic type filter element concentrically surrounding said first-named filter element with its innermost folds in contact with the outermost surface of said first-named filter element, a second tubular edge type filter element concentrically surrounding said pleated cellulosic type filter element, said concentric elements being separately insertable into and removable from the assembly, and means for directing filtration flow successively through all of the filter elements before emergence of filtrate from the assembly.

4. A filter assembly comprising a housing having inlet and outlet ports, a center tube within the housing communicating with one of its ports, a tubular edge type filter element one of its ends mounted on said center tube, an end member for the other end of said element, a tubularly-shaped, pleated, cellulosic type filter element concentrically disposed about said first-named element and having its innermost pleat folds in contact with the outermost surface of said first-named element, end caps for opposite ends of said pleated filter element to close off opposite ends of channels defined by its pleats, a tubular edge type element concentrically disposed about the pleated cellulosic filter element, an end member secured to one end of the second-named metallic edge type element and removably mountable on said center tube for supporting said second-named edge type element from said center tube, and an annular sealing member at the other end of said second-named edge type element, said end caps, said end member and said sealing member compelling filtration flow between the inlet and outlet ports of said housing in successive stages through the concentrically disposed filter elements, and said concentric elements being separately insertable and removable from the assembly.

5. In a filter assembly the combination of a tubular edge type filter element, a pleated cellulosic type filter element arranged in form of a tubular annulus positioned concentrically about the edge type element and having its innermost pleat folds in contact with the outermost surface of said edge type element, an end cap for one end of the edge type filter element and end caps for both ends of said cellulosic filter element, one of said last-named end caps having an opening aligned with the other end of said edge-type element and whose dimensions and shape correspond substantially with those at said other end of said edge type element.

6. In a filter assembly the combination of a tubular edge type filter element, a pleated cellulosic type filter element arranged in form of a tubular annulus whose pleat stretches extend substantially radially of the axis of the annulus and whose inner and outer pleat folds extend in parallelism with said axis, said cellulosic element being positioned concentrically about the edge type element with its inner pleat folds in contact with the outermost surface of said edge type element, an end cap covering one end of the edge type element, and end caps for both ends of said cellulosic element, one of said last-named end caps having an opening aligned with the other end of said edge type element to facilitate mounting of said two elements as a unit in the filter assembly.

References Cited in the file of this patent

UNITED STATES PATENTS

| | | |
|---|---|---|
| 1,251,601 | Weiwoda | Jan. 1, 1918 |
| 1,937,415 | Sidney | Nov. 28, 1933 |
| 2,271,054 | Williams | Jan. 27, 1942 |
| 2,533,192 | Kennedy | Dec. 5, 1950 |
| 2,543,165 | Harlan | Feb. 27, 1951 |
| 2,582,340 | Layte | Jan. 15, 1952 |
| 2,584,551 | Chambers et al. | Feb. 5, 1952 |

FOREIGN PATENTS

| | | |
|---|---|---|
| 681,379 | Great Britain | Oct. 22, 1952 |